United States Patent
Saucier et al.

(10) Patent No.: US 8,782,840 B2
(45) Date of Patent: Jul. 22, 2014

(54) ENERGY DAMPER-STORAGE DEVICE FOR LOW FLOOR VEHICLE ACCESS RAMP

(75) Inventors: Stanton D. Saucier, Tarzana, CA (US); Jaime Fernandez, Sylmar, CA (US)

(73) Assignee: Lift-U, Division of Hogan Mfg., Inc., Escalon, CA (US)

( * ) Notice: Subject to any disclaimer, the term of this patent is extended or adjusted under 35 U.S.C. 154(b) by 0 days.

(21) Appl. No.: 13/818,040

(22) PCT Filed: Aug. 22, 2011

(86) PCT No.: PCT/US2011/048569
§ 371 (c)(1),
(2), (4) Date: Jul. 9, 2013

(87) PCT Pub. No.: WO2012/024664
PCT Pub. Date: Feb. 23, 2012

(65) Prior Publication Data
US 2013/0276247 A1    Oct. 24, 2013

Related U.S. Application Data (60) Provisional application No. 61/375,563, filed on Aug. 20, 2010.

(51) Int. Cl.
*B65G 69/28* (2006.01)
(52) U.S. Cl.
USPC .......................................................... 14/71.3
(58) Field of Classification Search
USPC .................... 14/71.1, 71.3; 414/537, 921
See application file for complete search history.

(56) References Cited

U.S. PATENT DOCUMENTS

| | | | |
|---|---|---|---|
| 4,503,722 A | 3/1985 | Suzuki | |
| 5,111,912 A * | 5/1992 | Kempf | 187/250 |
| 5,224,722 A | 7/1993 | Kempf | |
| 5,338,264 A | 8/1994 | Kempf | |
| 5,871,329 A * | 2/1999 | Tidrick et al. | 414/537 |
| 7,533,432 B2 * | 5/2009 | Morris et al. | 14/71.3 |
| 7,533,433 B2 * | 5/2009 | Morris et al. | 14/71.3 |
| 7,533,434 B2 * | 5/2009 | Morris et al. | 14/71.3 |
| 7,681,272 B2 * | 3/2010 | Morris et al. | 14/71.3 |
| 7,913,341 B1 * | 3/2011 | Morris et al. | 14/71.3 |
| 7,913,342 B1 * | 3/2011 | Morris et al. | 14/71.3 |
| 7,913,343 B1 * | 3/2011 | Cohn | 14/71.3 |
| 8,020,234 B2 * | 9/2011 | Johnson et al. | 14/71.3 |
| 8,122,552 B2 * | 2/2012 | Morris et al. | 14/71.3 |
| 8,166,594 B1 * | 5/2012 | Morris | 14/71.3 |
| 8,327,485 B1 * | 12/2012 | Morris et al. | 14/69.5 |

FOREIGN PATENT DOCUMENTS

WO    2009134975 A1    11/2009

\* cited by examiner

*Primary Examiner* — Gary Hartmann
(74) *Attorney, Agent, or Firm* — Christensen O'Connor Johnson Kindness PLLC (57) ABSTRACT

A ramp assembly includes a frame assembly, a ramp connected to the frame assembly, a drive member having first and second engagements, and a counterbalance mechanism cooperating with the drive member. The ramp is pivotable relative to the frame assembly and has a deployed position and a stowed position. The drive member is configured to move the ramp between the deployed position and the stowed position. The counterbalance mechanism includes a gas strut having a first end and a second end. The first end of the gas strut is secured to the frame assembly and the second end of the gas strut is movable relative to the frame assembly. The first and second engagements of the drive member are configured to engage the second end of the gas strut.

20 Claims, 10 Drawing Sheets

ENERGY DAMPER-STORAGE DEVICE FOR LOW FLOOR VEHICLE ACCESS RAMP

BACKGROUND OF THE INVENTION

1. Field of the Invention

The present invention relates to an energy damper-storage device and compensating mechanism for a vehicle access ramp, particularly a low floor vehicle access ramp, sometimes called a "flip-over" or "fold-out" ramp.

2. Description of Related Art

A flip-over ramp assembly is normally stowed in a generally horizontal position in a recess in a vehicle floor and can be pivoted upward and outward to a downward sloping deployed position after the vehicle door has been opened as shown, for example, in U.S. Pat. No. 6,179,545 entitled "Flip-Over Ramp." The ramp assembly comprises a mounting enclosure and a ramp, which are pivotally connected at their adjacent edges, which provides a horizontal axis for movement of the ramp between deployed and stowed positions.

In the typical application, the ramp is located in the front door of the vehicle with a deployment path perpendicular to the length of the vehicle. In the fully stowed position, the ramp is essentially coplanar with the vehicle floor. In the deployed position, the ramp has moved through the front doorway to create a sloped surface between the sidewalk and the vehicle floor. The torque about the axis of rotation between the stowed and deployed positions is maximized when the ramp is at the extreme positions (fully deployed and fully stowed) and minimized when the ramp is positioned halfway between the extremes (i.e., when the ramp plate is at substantially right angles to the vehicle floor).

Ramp deploying mechanisms having torque compensating mechanisms are generally known in the art. See, for example, U.S. Pat. No. 6,843,635 entitled "Vehicle Fold-Out Ramp." However, typical prior art devices are often very complex and difficult to install and maintain. Thus, the reliability of such devices is reduced. When such devices fail, substantial forces are needed to move the vehicle ramp between stowed and deployed positions, which requires excessive manual labor or very heavy bearing loads during power-assisted stowing and deploying. Thus, typical prior art devices impose undue labor and material expense burdens on users. Further, such devices fail to provide a dampener for preventing free fall of the ramp when the ramp is positioned between the fully deployed and fully stowed positions.

Accordingly, there is a general need for a deploying mechanism for a vehicle access ramp that effectively counterbalances the weight of the vehicle access ramp so as to reduce the force required to move the ramp between deployed and stowed positions, as well as a corresponding dampening mechanism for preventing free fall of the ramp that eases manual operation, is less complex, lower in cost, and easier to install and maintain in comparison to prior art devices.

SUMMARY OF THE INVENTION

In one embodiment, a ramp assembly includes a frame assembly, a ramp connected to the frame assembly, a drive member having first and second engagements, and a counterbalance mechanism cooperating with the drive member. The ramp is pivotable relative to the frame assembly and has a deployed position and a stowed position. The drive member is configured to move the ramp between the deployed position and the stowed position. The counter balance mechanism includes a gas strut having a first end and a second end. The first end of the gas strut is secured to the frame assembly and the second end of the gas strut is movable relative to the frame assembly. The first and second engagements of the drive member are configured to engage the second end of the gas strut.

The second engagement may engage the second end of the gas strut and the first engagement may be spaced from the second end of the gas strut when the ramp is in the stowed position. The first engagement may engage the second end of the gas strut and the second engagement may be spaced from the second end of the gas strut when the ramp is in the deployed position. The ramp may have a neutral position that is intermediate the deployed position and the stowed position, where the first engagement and the second engagement each engage the second end of the gas strut. The ramp assembly may further include first and second sprockets secured to the frame assembly and rotatable relative to the frame assembly with the drive member positioned about the first and second sprockets and forming a closed loop.

The drive member may include an upper actuating bar, a lower actuating bar, rear flexible portion, and a front flexible portion. The front and rear flexible portions may each be secured to the upper and lower actuating bars with the front flexible portion positioned about the first sprocket and the rear flexible portion positioned about the second sprocket. The first engagement may comprise a tab extending downward from the upper actuating bar and the second engagement may comprise a tab extending upward from the lower actuating bar with the gas strut positioned between the upper and lower actuating bars. The front and rear flexible portions may comprise chains. The ramp assembly may further include an upper guide channel and a lower guide channel secured to the frame assembly with the upper guide channel receiving at least a portion of the upper actuating bar and the lower guide channel receiving at least a portion of the lower actuating bar. The gas strut may comprise a cylinder and a rod with the first end of the gas strut comprising a strut mounting and the second end of the gas strut comprising an end of the rod.

In another embodiment, a counterbalance mechanism for a ramp assembly including a frame and a ramp, where the ramp has a deployed position and a stowed position, includes a drive member having first and second engagements, and a gas strut having a fixed first end a second free end. The first end of the gas strut is configured to be secured to the frame of the ramp assembly and the second end of the gas strut is configured to be movable relative to the frame of the ramp assembly. The second end of the gas strut has an extended position and a retracted position where the second end of the gas strut is configured to move between the extended and retracted positions via engagement with the first and second engagements.

The first engagement may be configured to engage the second end of the gas strut when the ramp is in the deployed position and the second engagement may be configured to engage the second end of the gas strut when the ramp is in the stowed position. The counterbalance mechanism may further include first and second sprockets with the drive member positioned about the first and second sprockets and forming a closed loop.

Further details and advantages of the invention will become clear upon reading the following detailed description in conjunction with the accompanying drawing figures, wherein like parts are designated with like reference numerals throughout.

DESCRIPTION OF THE INVENTION

For purposes of the description hereinafter, spatial orientation terms, if used, shall relate to the referenced embodiment as it is oriented in the accompanying drawing figures or otherwise described in the following detailed description. However, it is to be understood that the embodiments described hereinafter may assume many alternative variations and embodiments. It is also to be understood that the specific devices illustrated in the accompanying drawing figures and described herein are simply exemplary and should not be considered as limiting.

Figure 1:
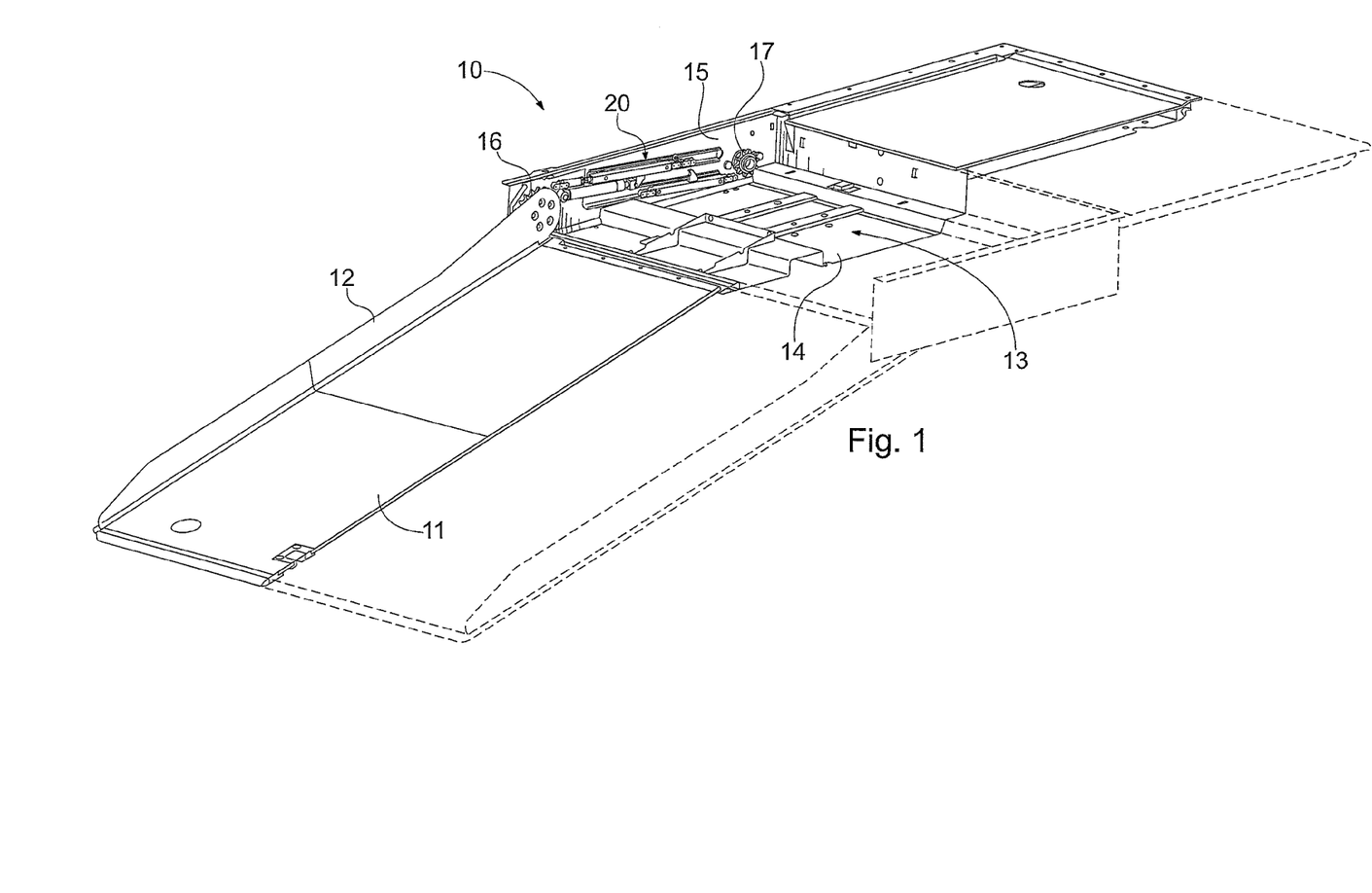
FIG. 1 is a top partial perspective view of a ramp assembly having an energy dampening-storing and torque compensating counterbalance assembly according to an embodiment of the present invention.
Figure 2:
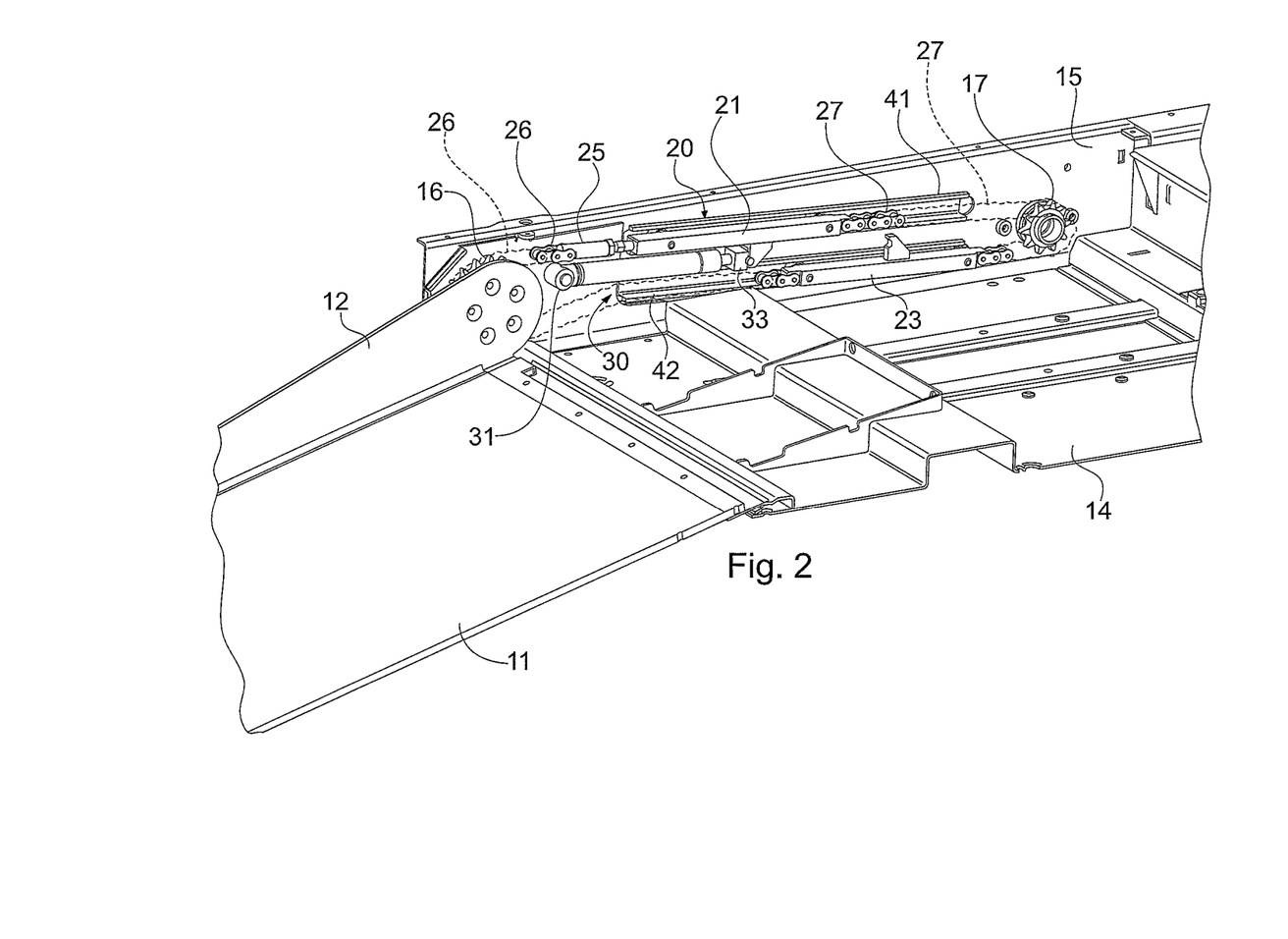
FIG. 2 is an enlarged perspective view of the ramp assembly of FIG. 1.
Figure 6:
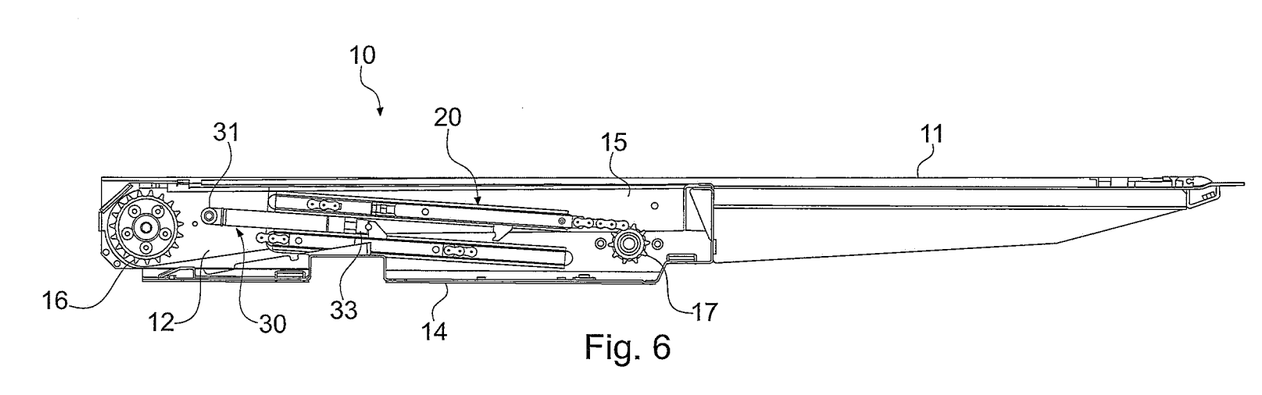
FIG. 6 is a side view of the ramp assembly of FIG. 1 with the ramp in a stowed position.

Referring to FIGS. 1 and 2, one embodiment of a ramp assembly 10 includes a vehicle access ramp 11 that is moved between a deployed position (shown in FIGS. 1, 2, and 10), a neutral position (shown in FIG. 8), and a stowed position (shown in FIG. 6). A drive mechanism (not shown) drives the ramp between the stowed and deployed position and works in conjunction with an energy dampening-storing and torque compensating counterbalance assembly 20. The drive mechanism may be of the type disclosed in International Patent Application Publication No. WO 2009/134975 entitled "Compensating Mechanism for a Vehicle Access Ramp."

Figure 3:
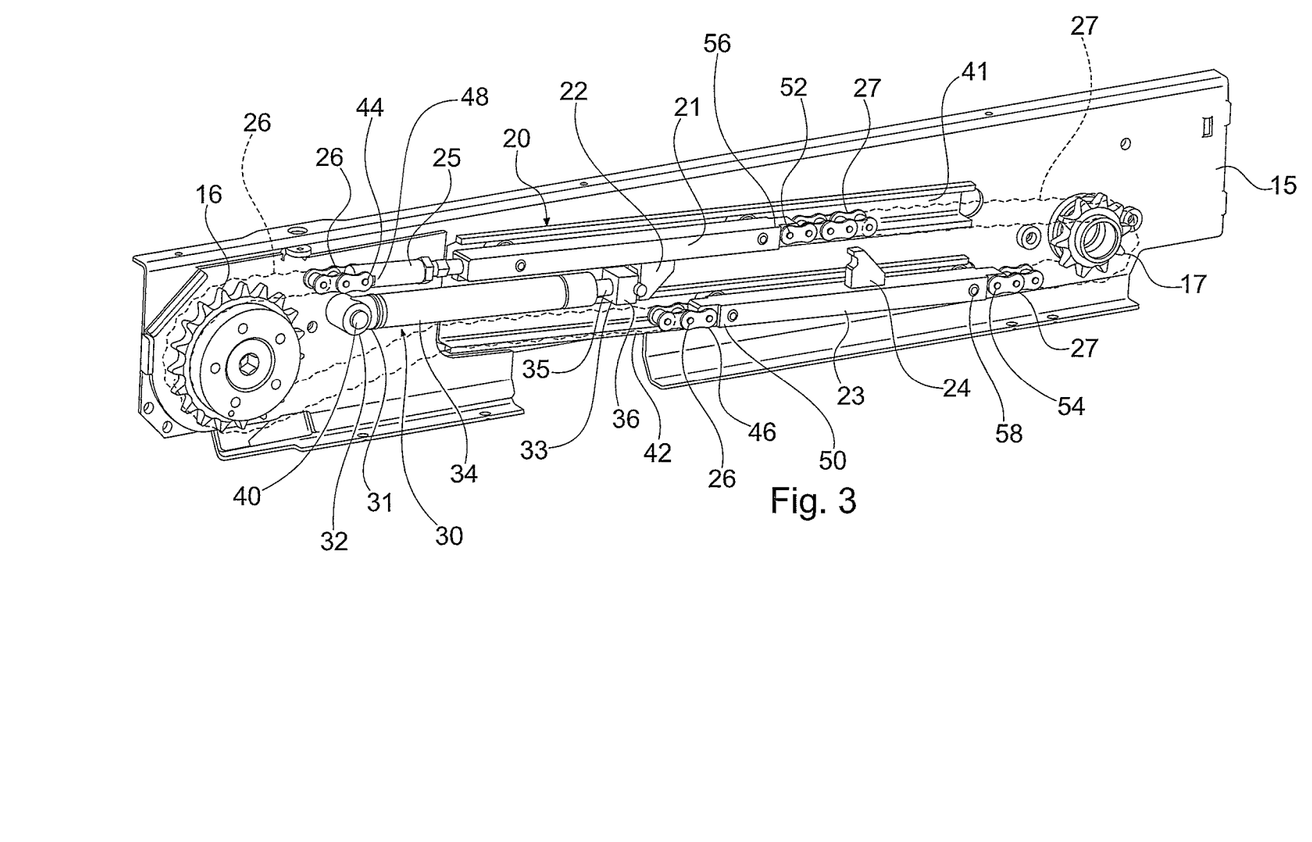
FIG. 3 is an enlarged perspective view of the counterbalance assembly of FIG. 1.

Referring again to FIGS. 1 and 2, the ramp 11 generally includes a flat plate with top and bottom surfaces. The ramp 11 is pivotably attached to ramp enclosure 13 that houses the counterbalance assembly 20 and the drive mechanism. The pivotal connection along one edge of the ramp and an adjacent edge of a floor 14 of the ramp enclosure 13 is supported by the ramp enclosure 13. In the deployed position, the top surface of the ramp 11 extends from the vehicle to a curb adjacent the vehicle (not shown). In the stowed position, the ramp 11 is rotated about 180° about the pivotal connection to extend over the ramp enclosure 13. A flange 12 is attached to a face of the ramp 11 and connects the ramp 11 to a ramp sprocket 16 of the counterbalance assembly 20, thereby applying a load torque caused by the weight of the ramp 11 and the flange 12 to the ramp sprocket 16. The flange 12 may also serve as a ramp side barrier of the ramp 11. The ramp enclosure 13, enclosure floor 14, and an enclosure wall 15 define a frame assembly that supports the counterbalance assembly 20. As shown in FIG. 3, the ramp sprocket 16 is mounted to the wall 15 of the ramp enclosure 13 and is able to rotate about a bearing extending from the wall 15. While only one counterbalance assembly 20, wall 15, and flange 12 are shown for the sake of clarity, a second counterbalance assembly 20, wall 15, and flange 12 may be provided at an opposite side of the ramp assembly 10 so as to support and move the ramp 11 at both sides thereof.

A drive sprocket 17 is also mounted to the wall 15 of the ramp enclosure 13 at a position opposite from the ramp sprocket 16 and is able to rotate about a bearing extending from the wall 15. The drive sprocket 17 is operatively connected to a drive shaft (not shown) of the drive mechanism. Rotation of the drive shaft causes application of a drive torque to the drive sprocket 17. The counterbalance assembly 20 is positioned on the wall 15 of the ramp enclosure 13 between the ramp sprocket 16 and the drive sprocket 17.

Figure 5:
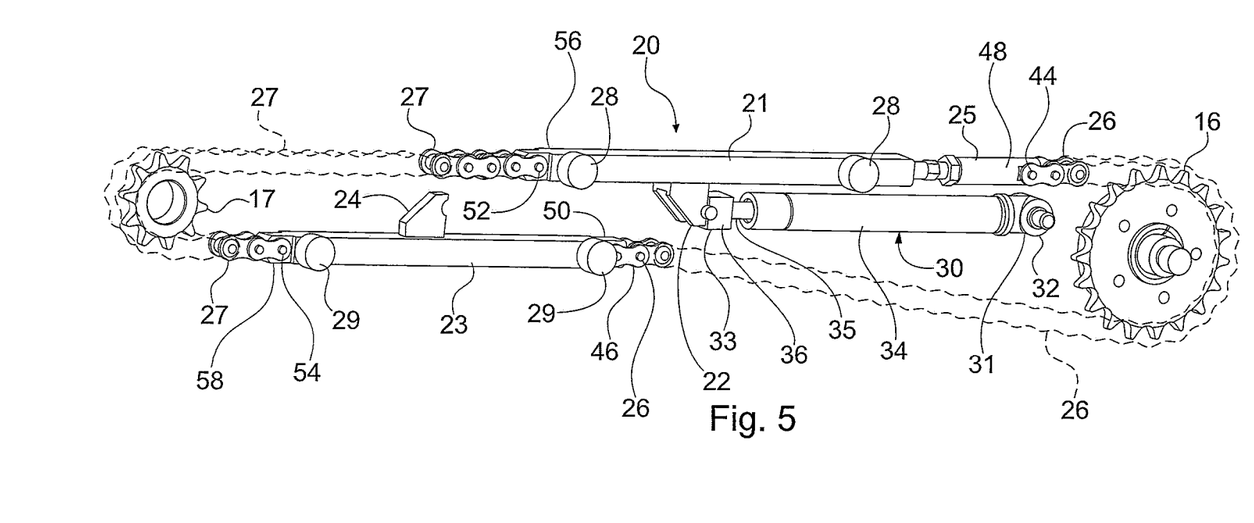
FIG. 5 is a reverse perspective view of the counterbalance assembly of FIG. 3.

As shown in FIGS. 2, 3, and 5, the drive sprocket 17 and the ramp sprocket 16 are attached to the wall 15 at distal positions. A front chain portion 26 is disposed about and engaged with the ramp sprocket 16 and has two opposing ends 44, 46, which are connected to respective front ends 48, 50 of an upper actuating bar 21 and a lower actuating bar 23 of the counterbalance assembly 20. A rear chain portion 27 is disposed about and engaged with the drive sprocket 17 and has two opposing ends 52, 54, which are connected to respective rear ends 56, 58 of the upper actuating bar 21 and the lower actuating bar 23. The combination of the front chain portion 26, rear chain portion 27, upper actuating bar 21, and lower actuating bar 23 defines a contiguous drive member, which transmits a drive torque from the drive sprocket 17 to the ramp sprocket 16 and a load torque from the ramp sprocket 16 to the drive sprocket 17. The upper actuating bar 21 also includes a chain tensioner 25, in the form of a threadably adjustable member, disposed on the front end thereof. The chain tensioner 25 is provided to minimize slack in both of the front and rear chain portions 26, 27 by effectively adjusting the length of the upper actuating bar 21.

For the sake of clarity, only portions of the front chain portion 26 and the rear chain portion 27 are shown. The full path of the front and rear chain portions 26, 27 is shown in phantom lines. The front chain portion 26 wraps around and engages the teeth about the perimeter of the ramp sprocket 16. The rear chain portion 27 wraps around and engages the teeth about the perimeter of the drive sprocket 17. The ramp sprocket 16 and the drive sprocket 17 may be a wheel member of any type known to those of ordinary skill in the art to be suitable for transmitting torque via a flexible member, including pulleys or sheaves. Likewise, the front and rear chain portions 26, 27 may be belt portions or bands made from an elastomeric material as opposed to chains.

With further reference to FIGS. 2, 3, and 5, the counterbalance assembly 20 also includes a gas strut assembly 30 disposed on the wall 15 between the upper and lower actuating bars 21, 23. The gas strut assembly 30 has a first end 31 mounted to the wall 15 of the ramp enclosure 13 by a strut mounting 32 and a second end 33 that engages the upper and lower actuating bars 21, 23 in a manner as described below in more detail. The second end 33 of the gas strut assembly is movable relative to the enclosure wall 15 and the first end 31 of the gas strut assembly 30. The gas strut assembly 30 includes a strut cylinder 34 that is charged with nitrogen gas and partially filled with oil to pressurize the nitrogen. The strut cylinder 34 may be pressurized with other gases and fluids known to those having ordinary skill in the art for use in different applications or for different performance of the gas strut assembly 30.

A strut rod 35 extends from the strut cylinder 34 and is reciprocable therein to alternately compress and release the gas within the strut cylinder 34. When the strut rod 35 is compressed into the strut cylinder 34, the gas inside the strut cylinder 34 is compressed. As long as the strut rod 35 is held in the compressed state, energy is available to move the strut rod 35 back to an extended position. The strut rod 35 also defines the second end 33 of the gas strut assembly 30 and includes an engagement block 36 on an end thereof.

The engagement block 36 on the end of the strut rod 35 of the gas strut assembly 30 is alternately engaged by an upper actuator tab 22 (first engagement) on the upper actuating bar 21 and a lower actuator tab 24 (second engagement) on the lower actuating bar 23 as the ramp 11 is driven between the stowed and deployed positions. The actuator tab 22 extends downwardly from the upper actuating bar 21 and the actuator tab 24 extends upwardly from the lower actuating bar 23. As the upper and lower actuating bars 21, 23 are moved in the forward direction during deployment and stowing of the ramp 11, the respective actuator tabs 22, 24 engage the engagement block 36 to compress or retract the strut rod 35 and compress the gas inside the strut cylinder 34. In particular, the actuator tabs 22, 24, are configured to engage the block 36 from a forward direction that extends from the drive sprocket 17 to the ramp sprocket 16. The energy stored by the compressed gas within the strut cylinder 34 operates to compensate for the torque applied to the counterbalance assembly 20 by the weight of the ramp 11 during movement of the ramp 11 from the stowed or deployed position.

Further, the piston (not shown) of the strut rod 35 includes a small orifice (not shown) therein. As the strut rod 35 compresses and extends within the strut cylinder 34, oil passes through the orifice in the piston. The passage of oil through the piston slows the piston and provides compression damping of the strut rod 35 to prevent acceleration or "free fall" of the ramp 11 during movement between the stowed and deployed positions.

Figure 4:
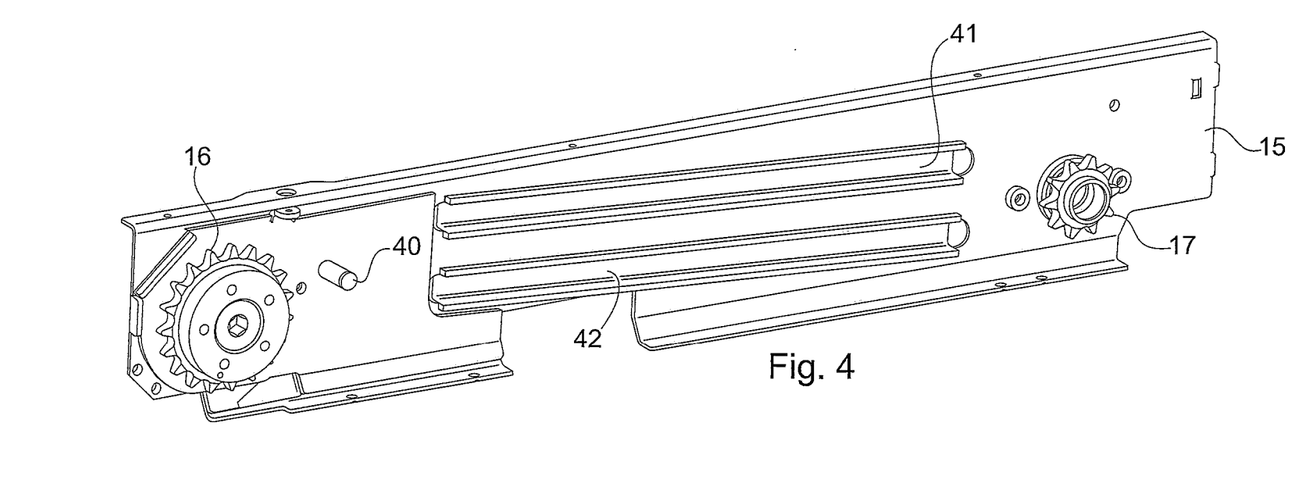
FIG. 4 is an enlarged perspective view of a wall of the ramp assembly of FIG. 1 with the counterbalance assembly removed.

As shown in FIG. 4, the wall 15 of the ramp enclosure 13 includes a gas spring mounting 40 extending therefrom, which is engaged by the strut mounting 32 at the first end 31 of the gas strut assembly 30 to mount the gas strut assembly to the wall 15. The gas spring mounting 40 may be a cylindrical-shaped pin, although other suitable mounting arrangements may be utilized. The wall 15 also includes an upper guide channel 41 and a lower guide channel 42 for engaging and receiving the upper and lower actuating bars 21, 23, respectively. The guide channels 41, 42 engage the respective actuating bars 21, 23 to counteract the offset moment created when one of the actuator tabs 22, 24 is compressing the gas strut assembly 30 and, thus, maintain the orientation and position of the actuating bars 21, 23.

As shown in FIG. 5, the upper actuating bar 21 includes a pair of bearing elements 28 and the lower actuating bar 23 includes a pair of bearing elements 28, 29. The bearing elements 28, 29 are configured to extend into and slidably engage the respective guide channels 41, 42, such that the actuating bars 21, 22 are able to slide in the forward and rearward directions with respect to the guide channels 41, 42, while preventing the actuating bars 21, 23 from falling or rotating. The specific construction of the bearing elements 28, 29 may be selected from a variety of different bearing constructions, such as cam followers, suitable for providing a sliding engagement between the actuating bars 21, 23 and the respective guide channels 41, 42. Different mechanisms retaining the actuating bars 21, 23 may be utilized. For instance, bar guiding rollers may be provided, which extend from the wall 15 of the ramp enclosure 13 and slidably retain the actuating bars 21, 23 between themselves.

Figure 7:
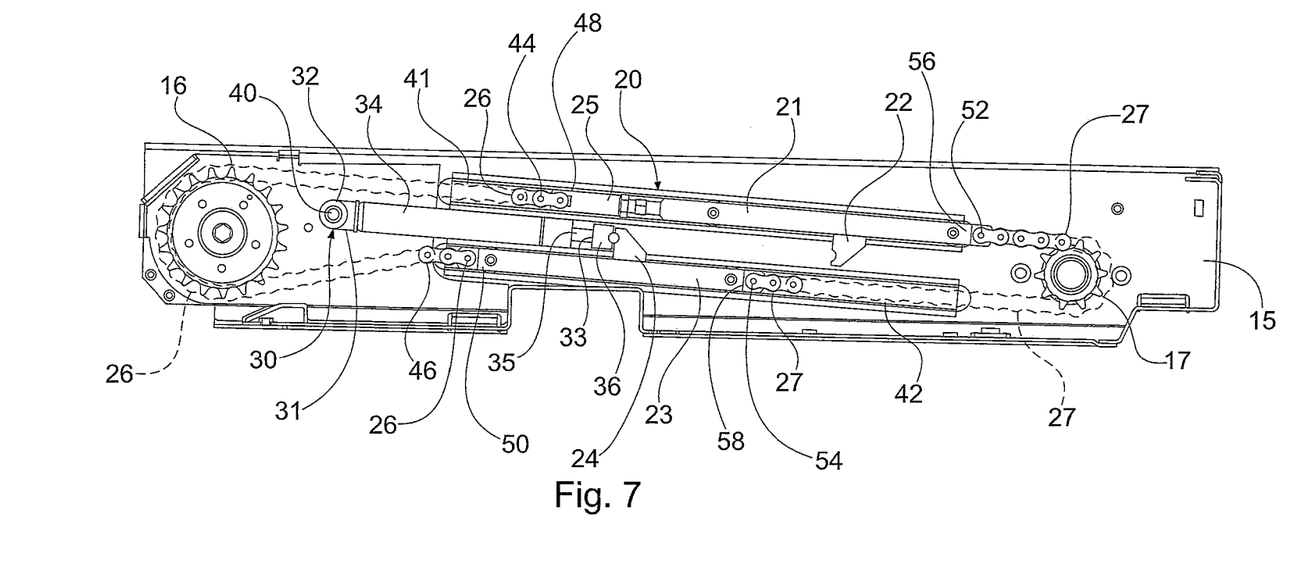
FIG. 7 is a side view of the counterbalance assembly of FIG. 3 when the ramp is in the stowed position.
Figure 8:
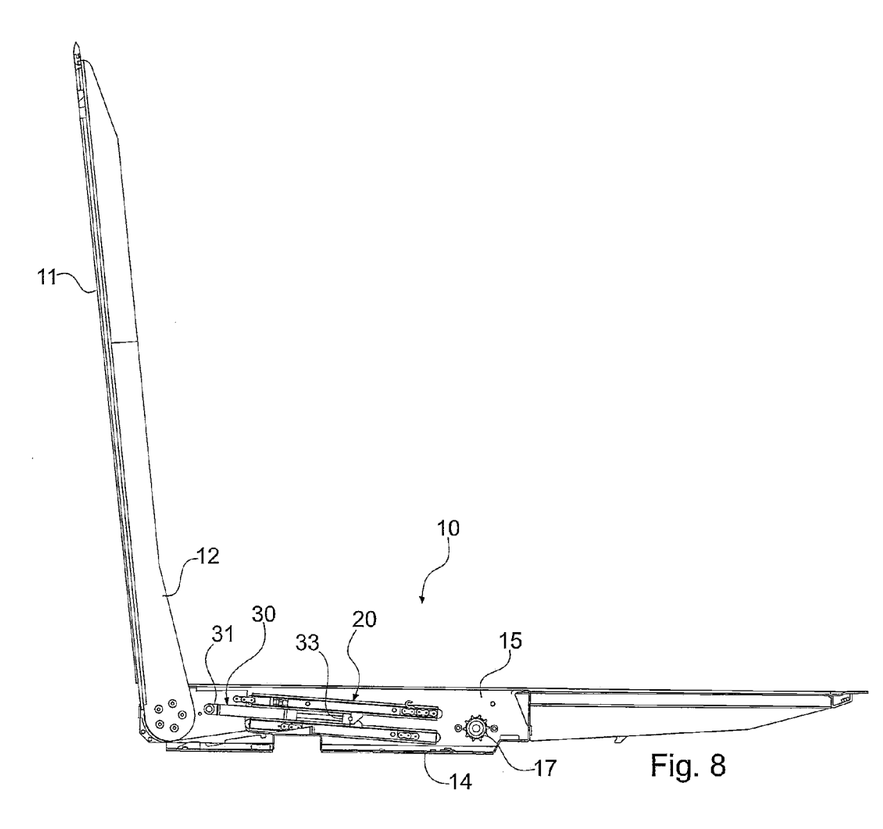
FIG. 8 is a side view of the ramp assembly of FIG. 1 with the ramp in a substantially vertical position.
Figure 9:
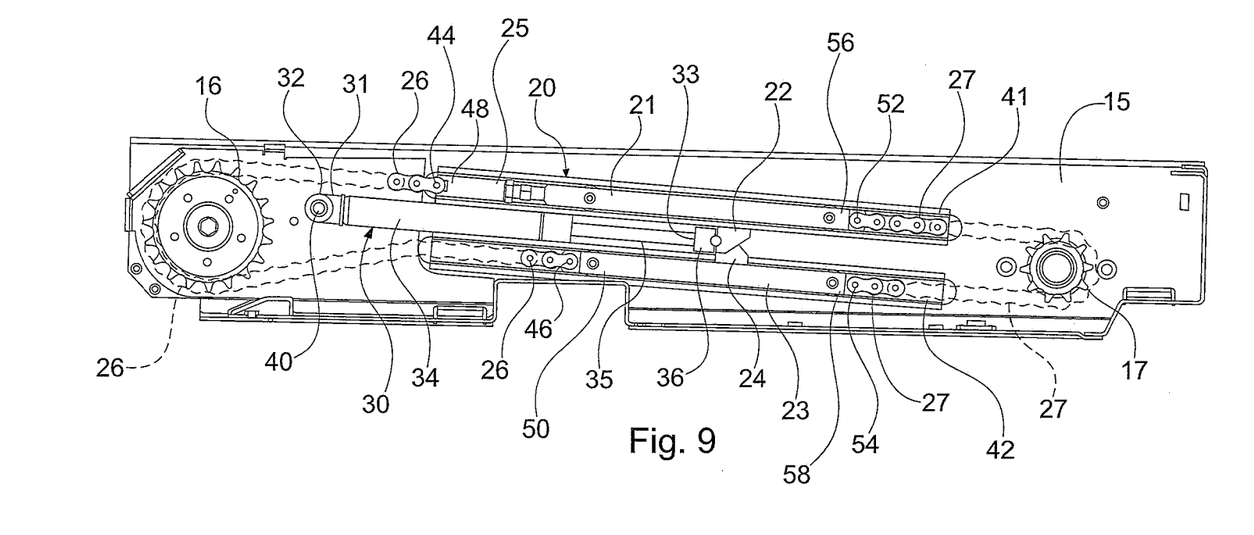
FIG. 9 is a side view of the counterbalance assembly of FIG. 3 when the ramp is in the substantially vertical position.
Figure 10:
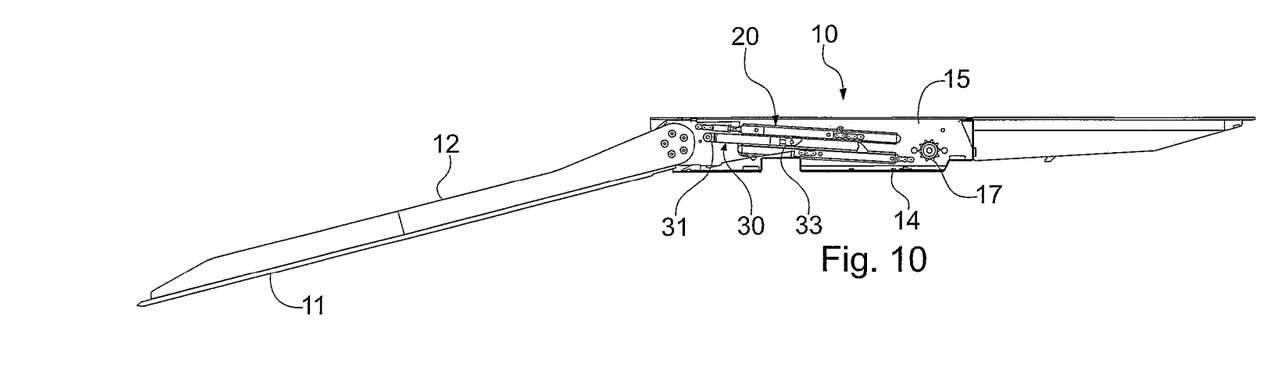
FIG. 10 is a side view of the ramp assembly of FIG. 1 with the ramp in a deployed position.

With reference to FIGS. 6-11, operation of the counterbalance assembly 20 acting as a bidirectional counterbalance to the weight of the ramp 11 in three basic positions is shown. A full operating cycle starts with the ramp 11 in a stowed position (FIG. 6). The ramp 11 is then moved in a first direction (counterclockwise) to a substantially vertical position, corresponding to a neutral position of the counterbalance assembly 20, by the drive mechanism via the counterbalance assembly 20 (FIG. 8). The ramp 11 is then moved further in the first direction until it reaches the deployed position (FIG. 10). To move the ramp 11 to the stowed position from the deployed position, the process is reversed with the ramp 11 moving in a second (clockwise) direction.

As shown in FIGS. 6 and 7, when in the stowed position, the ramp 11 is disposed substantially parallel to the floor 14 of the ramp enclosure 13 causing a load torque in the second (clockwise) direction to be applied to the ramp sprocket 16 and the drive sprocket 17 via the front and rear chain portions 26, 27 and the upper and lower actuating bars 21, 23. The lower actuating bar 23 has moved to its forward most position, such that the actuator tab 24 has engaged the engagement block 36 to compress the strut rod 35 of the gas strut assembly 30 within the strut cylinder 34 and moving the second end 33 of the gas strut assembly 30 to a retracted position. When second end 33 of the gas strut assembly 30 is in the retracted position energy is stored through the compression of the gas within the strut cylinder 34, which can be released when the ramp 11 is deployed. Accordingly, as it is released, the gas strut assembly 30 provides a counterbalancing torque acting in the first direction (counterclockwise) to be applied to the drive sprocket 17 and the ramp sprocket 16 via the front and rear chain portions 26, 27 and the upper and lower actuating bars 21, 23.

The drive mechanism engages the drive sprocket 17 to apply a drive torque in the first direction to cause the drive sprocket 17 to rotate in the first direction, which causes the rear chain portion 27 to move in a path about the drive sprocket 17. Thus, the ramp sprocket 16 is caused to rotate in the first direction, in turn, and lift the ramp 11 from the stowed position toward a substantially vertical position. As this occurs, the lower actuating bar 23 is slid rearward via its connection to the front and rear chain portions 26, 27 to release the gas strut assembly 30 such that a gradually decreasing counterbalance force/torque is provided by the gas strut assembly 30 in the first direction, proportional to the amount of compression of the gas strut assembly 30. The counterbalance force is applied to the drive sprocket 17 as the ramp 11 remains oriented toward the stowed position prior to reaching the substantially vertical position corresponding to the neutral position of the gas strut assembly 30. Thus, the drive mechanism is assisted in moving the ramp 11 from the stowed position toward the substantially vertical position, which substantially reduces drive motor torque and power necessary to deploy the ramp 11. As the ramp 11 approaches the substantially vertical position, the ramp 11 will be biased toward the substantially vertical position due to the alternating compression of the gas strut assembly 30 by the upper and lower actuating bars 21, 23.

As shown in FIGS. 8 and 9, as the ramp 11 reaches the substantially vertical position, the second end 33 of the gas strut assembly 30 moves to an extended position where the strut rod 35 is in a fully extended state with both actuator tabs 22, 24 of the upper and lower actuating bars 21, 23 located proximally to the engagement block 36 at the second free end 33 of the gas strut assembly 30, such that the gas strut assembly 30 is in a neutral, preloaded, position. As the ramp 11 passes through the substantially vertical position, the lower actuating bar 23 and actuator tab 24 move away from the engagement block 36 at the second end 33 of the gas strut assembly 30 while the upper actuating bar 21 and actuator tab 22 move toward the engagement block 36 of the gas strut assembly 30. As the ramp 11 continues to move toward the deployed position, the actuator tab 22 on the upper actuating bar 21 comes into contact with the engagement block 36 of the gas strut assembly 30 to cause the strut rod 35 to compress the gas strut assembly 30, such that a gradually increasing counterbalance force is provided to the point where the ramp 11 is fully deployed. The gas strut assembly 30 acts as a brake by causing a torque in the second direction (clockwise) that opposes the load torque, now acting in the first direction, caused by the weight of the ramp 11 until the tip of the ramp 11 touches ground.

Figure 11:
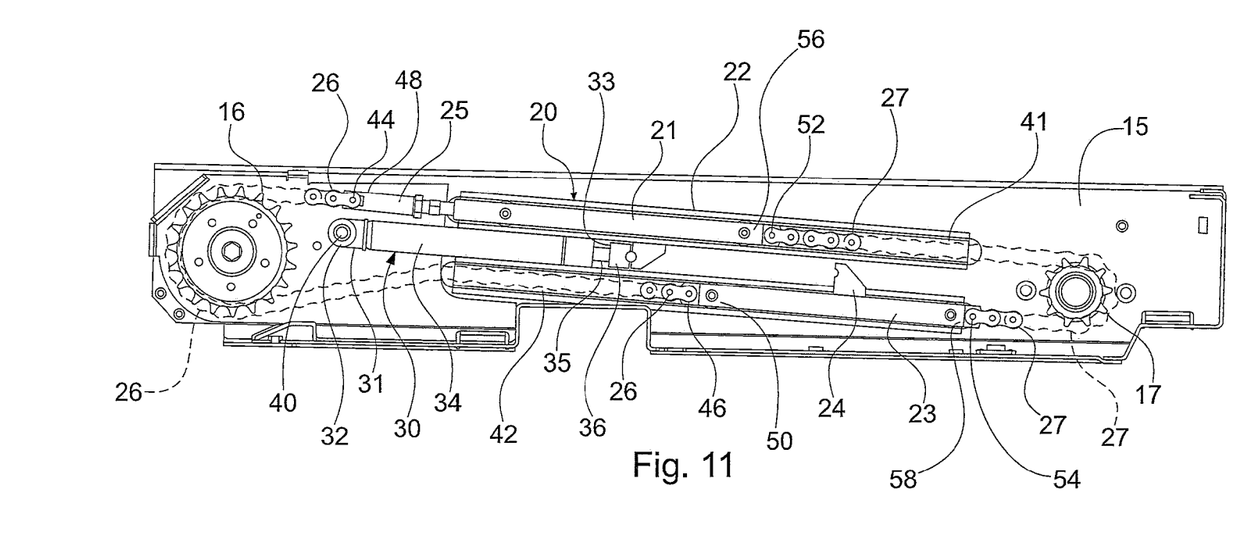
FIG. 11 is a side view of the counterbalance assembly of FIG. 3 when the ramp is in the deployed position.

As shown in FIGS. 10 and 11, when in the deployed position, the ramp 11 is disposed such that the tip of the ramp 11 touches the ground (not shown) causing a load torque in the first direction to be applied to the ramp sprocket 16 and the drive sprocket 17 via the front and rear chain portions 26, 27 and the upper and lower actuating bars 21, 23. At this point, the gas strut assembly 30 is in a compressed condition, as when the ramp 11 is in the stowed position. In particular, the second end 33 of the gas strut assembly 30 is in the retracted position with the strut rod 35 retracted within the cylinder 34 of the gas strut assembly 30. However, because the gas strut assembly 30 is now engaged by the actuator tab 22 on the upper actuating bar 21, which is disposed in its forward most position, the gas strut assembly 30 provides a counterbalancing force/torque in the second direction to be applied to the drive sprocket 17 and the ramp sprocket 16 via the front and rear chain portions 26, 27 and the upper and lower actuating bars 21, 23. As the ramp 11 is driven from the deployed position to the stowed position, the above-detailed cycle of release and extension of the gas strut assembly 30, passage through the neutral position, and re-compression of the gas strut assembly 30 is reversed until the ramp assembly 10 and the counterbalance assembly 20 reach the state shown in FIGS. 6 and 7.

Without the counterbalancing assembly 20, load torque would be passed from the ramp sprocket 16 to the drive sprocket 17 and drive torque would be equal to the load torque multiplied by a reduction rate. As can be appreciated, the counterbalancing assembly 20, according to the present invention, operates to save energy and reduce manual effort by applying a varying torque to the drive sprocket 17 and the ramp sprocket 16 via the front and rear chain portions 26, 27 and the upper and lower actuating bars 21, 23 that opposes the load torque caused by the weight of the vehicle ramp 11. While only one counterbalancing assembly 20 is necessary for moving the vehicle ramp 11 between positions, two or more may be used.

As can also be appreciated, the present invention is not limited to applications regarding the deployment of vehicle ramps but may be used in any device that may benefit from torque and power reduction.

While several embodiments of a ramp assembly having an energy dampening-storing and torque compensating counterbalance assembly were described in the foregoing detailed description, those skilled in the art may make modifications and alterations to these embodiments without departing from the scope and spirit of the invention. Accordingly, the foregoing description is intended to be illustrative rather than restrictive. The invention described hereinabove is defined by the appended claims and all changes to the invention that fall within the meaning and the range of equivalency of the claims are embraced within their scope.

The invention claimed is:
1. A ramp assembly comprising:
a frame assembly;
a ramp connected to the frame assembly, the ramp pivotable relative to the frame assembly and having a deployed position and a stowed position;
a drive member having first and second engagements, the drive member configured to move the ramp between the deployed position and the stowed position; and
a counterbalance mechanism cooperating with the drive member, the counterbalance mechanism including a gas strut having a first end and a second end, the first end of the gas strut secured to the frame assembly, the second end of the gas strut movable relative to the frame assembly, wherein the first engagement of the drive member is configured to engage the second end of the gas strut to bias the ramp toward the stowed position, and the second engagement of the drive member is configured to engage the second end of the gas strut to bias the ramp toward the deployed position.

2. The ramp assembly of claim 1, wherein the second engagement engages the second end of the gas strut and the first engagement is spaced from the second end of the gas strut when the ramp is in the stowed position.

3. The ramp assembly of claim 2, wherein the first engagement engages the second end of the gas strut and the second engagement is spaced from the second end of the gas strut when the ramp is in the deployed position.

4. The ramp assembly of claim 1, wherein the ramp has a neutral position that is intermediate the deployed position and the stowed position, and wherein the first engagement and the second engagement each engage the second end of the gas strut when the ramp is in the neutral position.

5. The ramp assembly of claim 1, further comprising first and second sprockets secured to the frame assembly and rotatable relative to the frame assembly, the drive member positioned about the first and second sprockets and forming a closed loop.

6. The ramp assembly of claim 5, wherein the drive member comprises:
an upper actuating bar;
a lower actuating bar;
a rear flexible portion; and
a front flexible portion, wherein the front and rear flexible portions are each secured to the upper and lower actuating bars, the front flexible portion positioned about the first sprocket, the rear flexible portion positioned about the second sprocket.

7. The ramp assembly of claim 6, wherein the first engagement comprises an actuator tab extending downward from the upper actuating bar and the second engagement comprises an actuator tab extending upward from the lower actuating bar, and wherein the gas strut is positioned between the upper and lower actuating bars.

8. The ramp assembly of claim 1, wherein the drive member comprises:
an upper actuating bar;
a lower actuating bar;
a rear flexible portion; and
a front flexible portion, wherein the front and rear flexible portions are each secured to the upper and lower actuating bars, and wherein the upper actuating bar, the lower actuating bar, the rear flexible portion, and the front flexible portion form a closed loop.

9. The ramp assembly of claim 8, wherein the first engagement comprises an actuator tab extending downward from the upper actuating bar and the second engagement comprises an actuator tab extending upward from the lower actuating bar, and wherein the gas strut is positioned between the upper and lower actuating bars.

10. The ramp assembly of claim 6, wherein the front and rear flexible portions comprise chains.

11. The ramp assembly of claim 6, further comprising an upper guide channel and a lower guide channel secured to the frame assembly, the upper guide channel receiving at least a portion of the upper actuating bar, the lower guide channel receiving at least a portion of the lower actuating bar.

12. The ramp assembly of claim 1, wherein the gas strut comprises a cylinder and a rod, with the first end of the gas strut comprising a strut mounting and the second end of the gas strut comprising an end of the rod.

13. A counterbalance mechanism for a ramp assembly including a frame and a ramp, the ramp having a deployed position and a stowed position, the counterbalance mechanism comprising:
 a drive member having first and second engagements;
 a gas strut having a fixed first end and a free second end, the first end of the gas strut configured to be secured to the frame of the ramp assembly, the second end of the gas strut configured to be movable relative to the frame of the ramp assembly, the second end of the gas strut having an extended position and a retracted position, and the second end of the gas strut configured to move between the extended and retracted positions via engagement with the first and second engagements, wherein engagement of the gas strut with the first engagement biases the ramp toward the stowed position, and engagement of the gas strut with the second engagement biases the ramp toward the deployed position.

14. The counterbalance mechanism of claim 13, wherein the first engagement is configured to engage the second end of the gas strut when the ramp is in the deployed position.

15. The counterbalance mechanism of claim 14, wherein the second engagement is configured to engage the second end of the gas strut when the ramp is in the stowed position.

16. The counterbalance mechanism of claim 13, further comprising first and second sprockets, the drive member positioned about the first and second sprockets and forming a closed loop.

17. The counterbalance mechanism of claim 16, wherein the drive member comprises:
 an upper actuating bar;
 a lower actuating bar;
 a rear flexible portion; and
 a front flexible portion, wherein the front and rear flexible portions are each secured to the upper and lower actuating bars, and wherein the upper actuating bar, the lower actuating bar, the rear flexible portion, and the front flexible portion form the closed loop.

18. The counterbalance mechanism of claim 17, wherein the first engagement comprises an actuator tab extending downward from the upper actuating bar and the second engagement comprises an actuator tab extending upward from the lower actuating bar, and wherein the gas strut is positioned between the upper and lower actuating bars.

19. The counterbalance mechanism of claim 18, further comprising an upper guide channel and a lower guide channel, the upper guide channel receiving at least a portion of the upper actuating bar, the lower guide channel receiving at least a portion of the lower actuating bar.

20. The counterbalance mechanism of claim 13, wherein the gas strut comprises a cylinder and a rod, the first end of the gas strut comprising a strut mounting and the second end of the gas strut comprising an end of the rod.

* * * * *